(12) United States Patent
Landskroon

(10) Patent No.: US 11,619,018 B2
(45) Date of Patent: Apr. 4, 2023

(54) SOIL PROBING DEVICE HAVING BUILT-IN GENERATORS AND DETECTORS FOR COMPRESSIONAL WAVES AND SHEAR WAVES

(71) Applicant: A.P. van den Berg Holding B.V., Heerenveen (NL)

(72) Inventor: Erik Peter Maria Landskroon, Heerenveen (NL)

(73) Assignee: A.P. Van Den Berg Holding B.V., Heerenveen (NL)

( * ) Notice: Subject to any disclaimer, the term of this patent is extended or adjusted under 35 U.S.C. 154(b) by 965 days.

(21) Appl. No.: 16/461,151

(22) PCT Filed: Nov. 15, 2017

(86) PCT No.: PCT/NL2017/050738
§ 371 (c)(1),
(2) Date: Dec. 10, 2019

(87) PCT Pub. No.: WO2018/093252
PCT Pub. Date: May 24, 2018

(65) Prior Publication Data
US 2020/0080270 A1   Mar. 12, 2020

(30) Foreign Application Priority Data
Nov. 16, 2016 (NL) .................................... 2017796

(51) Int. Cl.
*G01V 1/44* (2006.01)
*E02D 1/02* (2006.01)
(Continued)

(52) U.S. Cl.
CPC ............. *E02D 1/022* (2013.01); *G01V 1/303* (2013.01); *G01V 1/44* (2013.01); *G01V 1/52* (2013.01)

(58) Field of Classification Search
CPC .......... E02D 1/022; G01V 1/303; G01V 1/44; G01V 1/52
See application file for complete search history.

(56) References Cited

U.S. PATENT DOCUMENTS 3,604,667 A * 9/1971 De Moraes .............. B64G 1/62
244/158.9
4,382,384 A * 5/1983 Mitchell .................. G01N 3/40
73/594

(Continued)

OTHER PUBLICATIONS

Campanella, R.G. et al., "A Seismic Cone Penetrometer for Offshore Applications," In: "Oceanology"; Jan. 1, 1986, vol. 6, pp. 479-486.

(Continued)

*Primary Examiner* — Krystine E Breier
(74) *Attorney, Agent, or Firm* — Hoffmann & Baron, LLP (57) ABSTRACT

A soil probing device includes a probing rod with a measuring probe, a driving for penetrating the probing rod into the ground, generators for generating acoustic compression and shear waves into the ground, detectors for detecting the generated acoustic compression and shear waves. The detectors are built into the measuring probe. Also the generators are built into the measuring probe at positions that are interspaced at fixed distances in a z-direction from the detectors in the measuring probe. A processing unit CPU is provided for calculating velocities of the generated acoustic compression and shear waves that get to travel from the generators towards the detectors through local ground layers that lie adjacent the measuring probe in between the generators and detectors.

32 Claims, 5 Drawing Sheets

(51) Int. Cl.
*G01V 1/30* (2006.01)
*G01V 1/52* (2006.01)

(56) References Cited

U.S. PATENT DOCUMENTS

| | | | |
|---|---|---|---|
| 4,562,556 A | | 12/1985 | Ingram et al. |
| 4,641,520 A | * | 2/1987 | Mao ..................... E21B 49/006 73/152.58 |
| 4,874,061 A | | 10/1989 | Cole |
| 5,177,709 A | * | 1/1993 | Baziw ..................... G01V 1/42 367/38 |
| 5,432,305 A | * | 7/1995 | Nelson ................. G01N 29/045 181/101 |
| 2004/0226380 A1 | | 11/2004 | Xiangwu et al. |
| 2006/0062082 A1 | * | 3/2006 | Mandal .................... G01V 1/44 367/25 |
| 2006/0118353 A1 | | 6/2006 | Quinn et al. |
| 2009/0251993 A1 | | 10/2009 | Berris, Jr. et al. |
| 2019/0234848 A1 | * | 8/2019 | Karabacak ............. G01N 33/24 |

OTHER PUBLICATIONS

Fu, S.S. et al., "Acoustic lance: New in situ seafloor velocity profiles," The Journal of the Accoustical Society of America, Jan. 1, 1996, vol. 99, No. 1, pp. 234-242.
"Cone Penetration Test," Wikipedia Sep. 28, 2016 XP055388920, Retrieved from the internet https://en.wikipedia.org/w/index.php?title=Cone_penetration_test&oldid=741583371.

* cited by examiner

S-Wave  P-Wave

Coil/Hammer

Vibration motor

Coil/Magnet

Piëzo

Fig. 8

SOIL PROBING DEVICE HAVING BUILT-IN GENERATORS AND DETECTORS FOR COMPRESSIONAL WAVES AND SHEAR WAVES

CROSS-REFERENCE TO RELATED APPLICATIONS

This application is the National Stage of International Application No. PCT/NL2017/050738, filed Nov. 15, 2017, which claims the benefit of Netherlands Application No. NL 2017796, filed Nov. 16, 2016, the contents of which is incorporated by reference herein.

FIELD OF THE INVENTION

The invention relates to a soil probing device for determining velocities of acoustic compression respectively shear waves through ground layers.

BACKGROUND OF THE INVENTION

Such devices are already known for many years. For example U.S. Pat. No. 5,177,709 discloses a seismic cone penetration test (SCPT) in which a seismic sensor is installed in a cone penetrometer in addition to a bearing pressure sensor and a sleeve friction sensor. The cone penetrometer gets pushed intermittently into the ground. It is halted each time at intervals of 1 meter. When the penetrometer is halted, a seismic event is caused at ground surface near the insertion point where the penetrometer has first been inserted into the ground. For performing the seismic event an anvil is placed onto the ground near the insertion point, and a drop hammer that is attached to a swing arm gets to strike the anvil. This causes a seismic shock wave to propagate from the ground surface through various ground layers until this shock wave gets detected by the seismic sensor in the cone penetrometer. Subsequently the cone penetrometer is further advanced into the ground e.g. over a distance of 1 meter and the seismic event is then repeated. During each halt, the hammer alternatingly gets to strike against the anvil from a sideways horizontal direction such that a seismic shear shock wave gets introduced into the ground, and then against the anvil from above in the vertical direction such that a seismic compression shock wave gets introduced into the ground. By each time measuring the arrival time of the respective seismic shear and compression shock waves at the seismic sensor, it is possible to calculate the velocities of those respective shear and compression shock waves through the ground layers. Those velocities then can be used to determine elastic properties of the soil. Those elastic soil properties in turn can be used as input for the prediction of ground-surface motions related to earthquake excitation, for the design of foundations for vibrating equipment, to predict deformations around excavations, etc. When required, standard cone penetration test (CPT) parameters can be measured during the intermittent pushing movements of the penetrometer. These parameters for example are cone tip resistance, sleeve friction and other.

A disadvantage with this known system is that its use is somewhat costly and time-consuming since after each meter the pushing movement of the penetrometer into the ground needs to be halted and then after performance of the seismic tests needs to be started again. This intermittent pushing of the penetrometer into the ground may even influence the ground layers, leading to possible misinterpretations of the local soil properties. Furthermore the accuracy of detection of the shear and compression shock waves at its seismic sensor leaves to be improved. In particular when the depth of measurement gets large, the strength of the shock wave signal may get dampened too much. Increasing of the strength of the shock wave signal is only possible up to a certain extent because otherwise it destroys the top ground layer. Another disadvantage is that a fluctuating annular fault gets made because of a horizontal distance between the generators, which get placed above ground interspaced from the insertion point of the probing rod, whereas the detectors are built into the measuring probe close to or around the central axis of the probing rod.

US 2004/0226380 discloses a penetrometer having two horizontally spaced apart cone penetrometer shafts that are rigidly connected to each other. The one shaft is fitted with a set of vertically spaced apart transmitters for wave transmission. The other shaft is fitted with a set of vertically spaced apart receivers for wave receiving. The purpose hereof is to measure wave propagation horizontally and diagonally.

A disadvantage with this construction however is that its functioning and measurement results leave to be improved. For example it is unable to make use of seismic compression waves that get introduced in a vertical direction into the ground. Furthermore this two-shaft penetrometer is difficult to use in practice because it is hardly possible to have the two shafts penetrate at equal speed into the ground because of differing ground conditions they are going to meet. Also the interlinked two-shaft construction is unusable for SCPT testing at larger depths.

SUMMARY OF THE INVENTION

The present invention aims to overcome those disadvantages at least partly and/or to provide a usable alternative. In particular the present invention aims to provide an improved soil probing device with which accurate SCPT parameters as well as accurate CPT parameters can be derived in a time-efficient and cost-saving manner.

This aim is achieved by a soil probing device according to the present invention. The device comprises a probing rod with a measuring probe at its lower end. The probing rod has a central axis extending in a z-direction. Driving means are provided for penetrating the probing rod in the z-direction into the ground. The probing rod can be composed out of one piece, but for larger depths it preferably comprises a plurality of interconnectable rod sections, such that the probing rod, while being penetrated into the ground, may be extended at its upper end each time by a new one of such rod sections. The device also comprises one or more generators for generating acoustic compression waves with a vibration direction in said z-direction into the ground and for generating acoustic shear waves with a vibration direction in an x-y direction perpendicular to said z-direction into the ground, as well as one or more detectors for detecting said generated acoustic compression waves and for detecting said generated acoustic shear waves. A processing unit is provided for determining properties of soil during penetration of the probing rod into the ground. The detectors are built into the measuring probe. According to the inventive thought also the generators are built into the measuring probe. With this the generators are built into the measuring probe at positions that are interspaced at fixed distances in said z-direction from the positions where the detectors are built into the measuring probe. The processing unit is designed for calculating velocities of said generated acoustic compression waves respectively acoustic shear waves that get to travel from the built-in generators towards the built-in detectors through local ground layers that lie adjacent and against the measuring probe in between the built-in generators and detectors.

Thus, the generators and detectors of this soil probing device are both taken along by the probing rod when it is introduced into the ground. The acoustic compression and shear waves now can get directly generated into specifically those local ground layers that lie adjacent and against the measuring probe in between the built-in generators and detectors where the measuring probe at that time is passing through/along. Fixed distances are maintained at all times between the built-in generators and detectors, and thus are fully independent of the penetration depth. Owing to those fixed distances between the generators and detectors, a damping of the generated acoustic compression and shear waves during measurements at greater depths is no longer critical. The generated acoustic waves do not have to be repeated, stacked or increased at such greater penetration depths. This in contrast to the state of the art where the generators remain above ground and where the distance between the generators and detectors thus keeps on increasing during further penetration of the probing rod into the ground. This advantageously makes the measuring depth with the soil probing device according to the invention unlimited. Furthermore the speed and accuracy of the calculating of the velocities of generated acoustic compression and shear waves through the ground layers can now substantially be improved. For example it is now possible to place the generators at a same x-y position relative to the central axis of the probing rod as the detectors. In this way no angular fault gets made. Furthermore, the accuracy can be improved because for obtaining local soil properties it is no longer necessary to make subtractions between successive acoustic measurements. Another advantage is that because of the built-in generators and detectors, the operational complexity has become easier. For example in offshore usage this is important because there the placing of the generators on the bottom of the sea is rather complex if not impossible at greater depths. Also human mistakes with the placing and operating of the generators can no longer be made, less preparation time is necessary and the device gets less vulnerable for failure and maintenance.

The soil probing device according to the invention can advantageously be used as a penetrometer with a fully integral geophone set in its measuring probe to truly accurately measure local speed of sound in x-, y or z-direction in undisturbed soil of ground layers to thus gather acoustic seismic shear wave and/or acoustic seismic compression wave velocities. Only one single probing rod and measuring probe suffice for this. The measured and determined data for example may help to determine shear modulus and Poisson's ratio at intervals through soil of ground layers for soil liquefaction analysis and low-strain soil strength analysis. Engineers may use the shear wave velocity and shear modulus to determine the soil's behaviour under low-strain and vibratory loads.

The invention preferably relates to a soil probing device of a penetration/penetrometer type, that is to say for Penetration Testing, with which probings/soundings take place during which the measuring probe is penetrated, preferably by means of pushing, into undisturbed soil for measuring geotechnical soil characteristics of ground layers.

According to the invention the measuring probe at its free lower end, in front of the built-in generators and detectors, comprises a nose section, in particular a nose section with gradually increasing outer cross-sectional dimensions, which nose section has a maximum outer cross-sectional dimension that is equal to or smaller than maximum outer cross sectional dimensions of the detectors and generators that lie above this nose section, such that the detectors and generators come to lie directly against soil of local ground layers during penetration of the probing rod with the measuring probe into the ground. Thus it can be guaranteed that the built-in generators and detectors automatically get to slide along substantially undisturbed soil of the local ground layers during penetration of the soil probing device into the ground, while at a same time coming in direct contact with the substantially undisturbed soil of those local ground layers by lying against it.

More preferably the invention relates to a soil probing device of a cone penetration/cone penetrometer type, that is to say for Cone Penetration Testing, with which the measuring probe has a conical nose section at its free lower end that has its tip facing down such that, during probings/soundings, it can be penetrated into the ground, preferably by means of pushing, into undisturbed soil of ground layers for measuring geotechnical soil characteristics of those ground layers. The conical nose section then may help to prevent that the soil of the ground layers get disturbed during the probings/soundings.

It is noted that U.S. Pat. No. 5,432,305 already discloses an acoustic penetrometer probe in which the probe includes an acoustic generator mounted in the probe for generating a below-ground shock wave and an acoustic detector located in the probe to measure shock waves reflected from objects or materials located within about 10 metres radially around the probe. However this known acoustic penetrometer probe is specifically destined to localise objects by means of x-y measurement based on acoustic reflections. It is not destined nor possible to derive SCPT parameters with it by means of generating and detecting acoustic compression and shear waves. For example the generator is unsuitable to generate a compression wave in the z-direction and the detector is only measuring in x-y direction. Furthermore, the detector here each time gets shut off at the moment of impact of the striker of the generator for an acoustic wave propagation time of a few centimetres, to avoid measuring a direct wave at the detectors. Thus the known probe only is able to provide a horizontal radial picture of discontinuities in soil and is thus fundamentally a sonar like device, detecting concrete objects, but does not measure actual soil properties.

Furthermore it is noted that US 2006/0062082 discloses a drilling assembly for petroleum drilling and production operations, that has a drill string with a drill bit. Above the drill bit an acoustic logging tool is provided. This acoustic logging tool comprises sources for periodically producing acoustic waves and a receiver array for detecting pressure variations in waves that propagate past this receiver array. However, acoustic profiling during drilling cannot be compared with the probing/sounding with the soil probing device according to the present invention. This acoustic profiling during drilling is not destined for geotechnical testing during penetrating of a probing rod with a measuring probe into the ground. It is unusable for measuring local speed of sound in undisturbed soil of ground layers. Instead it is used for determining certain characteristics of formations traversed by a thus drilled wellbore for petroleum along with data relating to size and configuration of the borehole itself. Also it is used for determining direction and inclination of the drill bit, so that the assembly can be steered in the correct direction. Even if desired, the drill bit would make it impossible to use this drilling assembly with integrated acoustic logging tool as soil probing device for measuring local speed of sound in undisturbed soil of ground layers. This is because the soil in the ground layers get irreversibly damaged by the drill bit. Furthermore the drill bit has a larger diameter than the logging tool, which causes the logging tool to be forced to operate in free space around the drill string, which space may be filled with air or drilling fluid. This makes it impossible for the sources and receiver array of the logging tool to directly lie against soil of ground layers they are passing. The signal that is produced by the logging tool in this spacing, merely are able to form boundary waves or interface waves, also known in the field as Stonely waves. Such Stonely waves are commonly generated during borehole sonic logging and vertical seismic profiling. They propagate along the walls of the fluid-filled borehole and their attenuation is sensitive to fractures and formation permeability. Therefore, analysis of Stonely waves merely makes it possible to estimate these rock properties and provide an indication for the quality of the rock wall of the drilled wellbore. The Stonely waves do not propagate through the ground/rock and thus are unusable for measuring local speed of sound therein.

Further it is noted that U.S. Pat. No. 4,562,556 discloses a downhole orbital seismic source that hangs underneath a receiver sonde. However this known assembly is no CPT-probing device, neither is it usable as one. For example the source and receiver sonde can only be lowered into an already drilled hole that has been filled with a liquid. The source and receiver sonde have diameters that must be smaller than the already drilled hole, which causes them to operate in free space around the sonde The source and receiver sonde are unable to directly lie against undisturbed soil of ground layers they are penetrating through. The signal that is produced by the source sonde in this spacing, thus also merely forms the abovementioned Stonely waves that propagate along the borehole walls instead of through the ground/rock and thus are unusable for measuring local speed of sound therein.

Finally it is noted that the articles "Acoustic lance: New in situ seafloor velocity profiles"—S. S Fu et al in "The journal of the Acoustical Society of America" out of 1996 and "Acoustic properties of coral sands, Waikiki, Hawaii"— S. S Fu et al in "The journal of the Acoustical Society of America" out of 2004, both show an acoustic lance that has an acoustic source installed on top of the lance at fixed distances relative to the receivers. Here however the lance first gets embedded together with the receivers into the seafloor, and only thereafter the acoustic source gets installed on top of the lance above seafloor level. A penetrating of the lance together with both the receivers and the acoustic source into the seafloor, while at the same time having them automatically get to slide along and come in direct contact with substantially undisturbed local sediment layers, while simultaneously performing measurements is not foreseen nor possible herewith.

In a preferred embodiment according to the present invention the built-in generators can comprise sinusoidal vibration sources for generating sinusoidal acoustic compression respectively sinusoidal acoustic shear waves. By making use of generated sinusoidal waves, the detected detector signal advantageously can be filtered narrowband. Any noise of other sources, like for example rotating motors above ground, and contact sounds between the probing rod and the ground can be eliminated. Furthermore, the sinusoidal waves advantageously are symmetric owing to which critical zero crossings can be determined univocally.

In a further preferred embodiment the built-in generators may be designed for generating said sinusoidal acoustic compression waves respectively said sinusoidal acoustic shear waves at frequencies of at least 50 Hz. For frequencies of at least 50 Hz it has appeared possible to add acoustic compression wave velocity and acoustic shear wave velocity as extra parameters to the CPT parameters that nowadays get measured during a standard cone penetration test (5 samples of each soil parameter per second) at a penetration speed of the probing rod of at least 2 cm per second. For this the penetrating of the probing rod into the ground does not have to be stopped during the acoustic measurements, but advantageously can take place during a continuous penetrating movement of the probing rod into the ground. Thus it can be said that for the first time a "continuous" seismic cone penetration test is possible with the invention. The invention advantageously makes it possible to use such high frequencies because of the relative short fixed distances between the generators and detectors, and because damping hardly plays a role anymore. Owing to this the generators can be miniaturized and owing to this truly fast acoustic measurements can be done. Another advantage is that the contact surface with the surrounding ground gets less disturbed because at those high frequencies a smaller mechanical amplitude is necessary.

In an embodiment the detectors preferably may lie at a side of a front end section of the measuring probe, and the generators then may lie at a side of a rear end section of the measuring probe. An intermediate section of the measuring probe then lies in between the detectors and generators. By placing the generators above the detectors, it is prevented that the detectors have to operate in an area that already may be influenced by the generators.

In addition or in the alternative the detectors or generators that lie at a side of a rear end section of the measuring probe may have an outer cross sectional dimension that is larger than the outer cross sectional dimension of the detectors or generators that lie at a side of a front end section of the measuring probe, in particular between 1-5 mm larger. Thus the diameter of the measuring probe increases stepwise. This helps to create an optimal contact between the ground layers and the generators and detectors respectively during the penetration and measurements.

In addition or in the alternative the generators may have an outer cross-sectional dimension that is larger than an outer cross sectional dimension of an intermediate section of the measuring probe lying in between the generators and detectors, in particular between 1-5 mm larger. Thus the generators get to have an axial end face part that projects outside the intermediate section. This helps to more efficiently being able to generate the acoustic compression waves in the z-direction along the outside of the intermediate section of the measuring probe.

In a preferred embodiment the fixed distances in said z-direction between the generators and detectors lies somewhere between 10-50 cm. This small distance helps to minimize damping of the wave signals when traveling through the ground layers from the built-in generators towards the detectors.

The generators and/or detectors can be flexibly connected in the x-y and/or z-direction to the measuring probe. This helps to prevent that the generated acoustic wave signals get transferred towards the detectors via wall parts of the measuring probe. It is however also possible to dispense such a flexible connection. In particular for the generating of the acoustic shear waves it may also be sufficient to position the generators directly behind a thin wall part of the measuring probe, such that this wall part itself can function as a vibrating element.

When required, standard cone penetration test (CPT) parameters can be measured during the penetration of the probing rod into the ground. These parameters for example are cone tip resistance, sleeve friction, inclination, water pressure and/or temperature. If desired even further parameters can be measured during the penetration of the probing rod into the ground. For this, the measuring probe according to the invention then amongst others further may use the above-mentioned conical nose section for measuring cone tip resistance, and/or may comprise a friction sleeve for measuring sleeve friction during penetration of the probing rod into the ground. Thus a total measured resistance during penetration of the rod into the ground can be separated into components generated by a tip of its nose section (the "tip friction") and friction generated by the rod string. With those components, bearing capacity and/or cohesive strength can be determined. Furthermore the measuring probe may also comprise an inclination sensor, a water pressure sensor and/or a temperature sensor. Advantageously each of those measuring means then can be provided inside a distinctive section of the probe, for example inside a module, that is removably connectable to other parts of the measuring probe, like a click-on module. When certain CPT parameters are not required then those modules can be dispensed with and/or be used with a dummy tip instead.

Further preferred embodiments are described herein.

The invention also relates to methods described herein.

BRIEF DESCRIPTION OF THE DRAWINGS

The invention shall be explained in more detail below with reference to the accompanying drawings in which.

DETAILED DESCRIPTION OF THE INVENTION

Figures 1, 2:
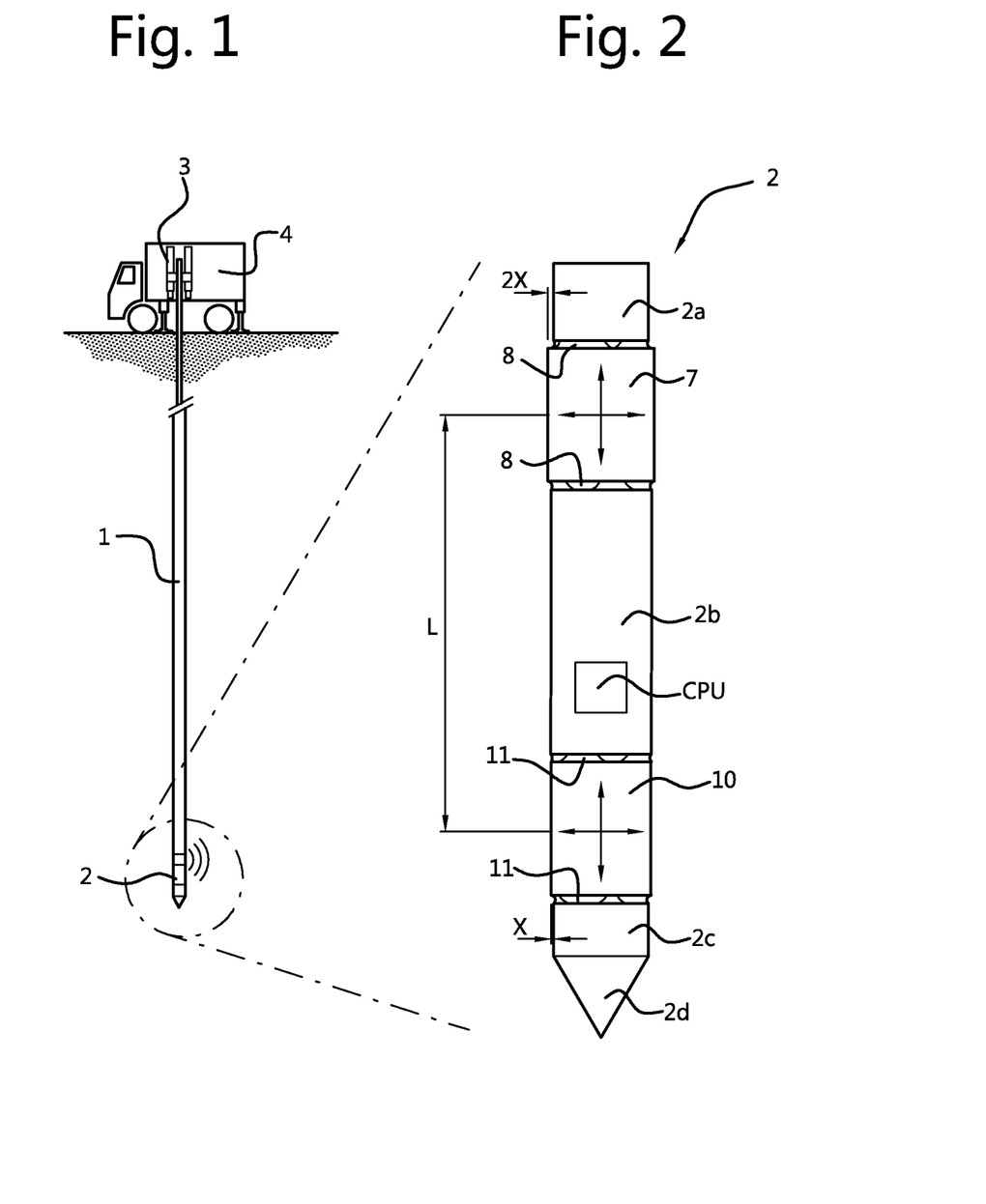
FIG. 1 schematically shows an embodiment of a soil probing device according to the invention.
FIG. 2 shows an enlarged partial view of the measuring probe of FIG. 1.
Figure 3:
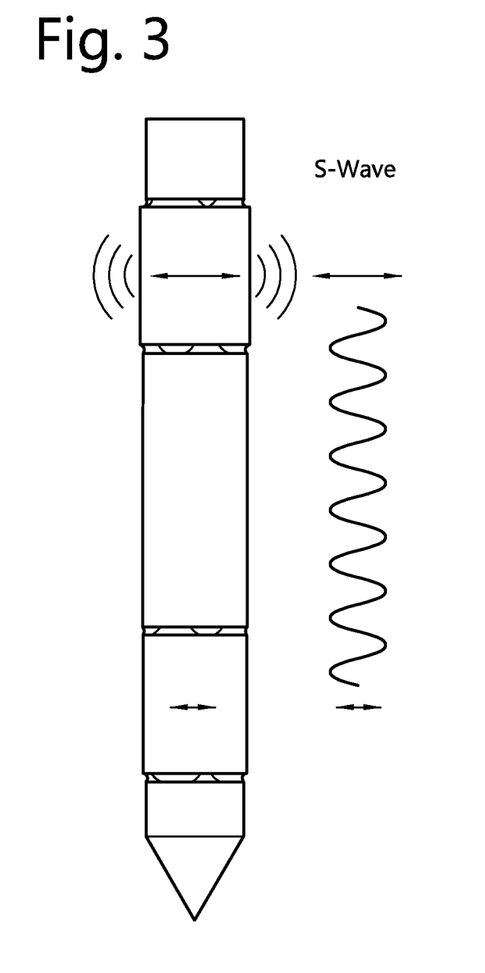
FIG. 3 shows the view of FIG. 2b during the generating of an acoustic shear wave.
Figure 4:
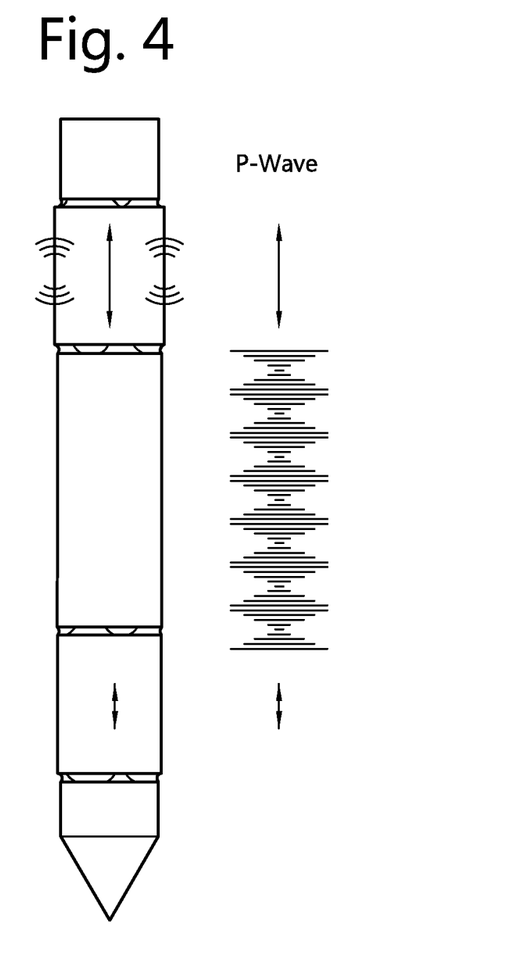
FIG. 4 shows the view of FIG. 2b during the generating of an acoustic compression wave.

In FIG. 1 a soil probing device comprises a probing rod which has been given the reference numeral 1. The probing rod 1 at its lower free end comprises a measuring probe 2. The probing rod 1 and measuring probe 2 have a common central axis that extends in a vertical z-direction. The rod 1 with the probe 2 can be pushed downwardly into the ground by means of a suitable drive means 3 that is provided by a testing vehicle 4.

The measuring probe 2 comprises a built-in generator 7 that is formed by a sinusoidal vibration source that is designed for alternatingly generating sinusoidal acoustic compression waves (P-waves) with a vibration direction in the z-direction respectively sinusoidal acoustic shear waves (S-waves) with a vibration direction in the x-y direction into the ground. The generator 7 is tubular shaped and is flexibly connected by means of flexible connections 8 to a tubular shaped rear end section 2a and to a tubular shaped intermediate section 2b of the probe 2. The flexible connections 8 are such that the generator 7 has freedom to flexibly move relative to the sections 2a, 2b in the x, y and z-directions, and for example are formed by a rubber part or a spring element.

The measuring probe 2 further comprises a built-in detector 10 that is designed to alternatingly detect the generated sinusoidal acoustic compression waves in the z-direction respectively the generated sinusoidal acoustic shear waves in the x-y direction that have travelled through the ground layers that lie in between the generator 7 and detector 10. The detector 10 is tubular shaped and is flexibly connected by means of flexible connections 11 to the intermediate section 2b and to a tubular shaped front end section 2c of the probe 2. The flexible connections 11 are such that the detector 10 has freedom to move relative to the sections 2b, 2c in the x, y and z-directions, and for example are formed by a rubber part or a spring element.

The generator 7 lies above the detector 10 at a fixed distance L which for example lies between 10-50 cm. The detector 10 has been designed with an outer diameter that is X mm larger than the front end section 2c, for example 2 mm larger. The intermediate section 2b has been designed with a same outer diameter as the detector 10. The generator 7 has been designed with an outer diameter that is X mm larger than the intermediate section 2b resp. the detector 10. The end section 2a has been designed with a same diameter as the front end section 2c, that is to say 2X mm smaller than the generator 7. The diameter of the front and end sections 2c, 2a for example can be around 36 mm.

The measuring probe 2 at its end section 2a is provided with coupling means for example screw thread or a bayonet coupling with which it is coupled to the rest of the probing rod 1. At its front end the measuring probe 2 further comprises a conical nose section 2d for measuring cone tip resistance. Furthermore a friction sleeve for measuring sleeve friction during penetration of the probing rod into the ground can be provided on the measuring probe 2. This friction sleeve for example can be provided along the intermediate section 2b, but preferably just above the conical nose section 2d.

Inside the measuring probe 2 an embedded central processing unit (CPU) is provided which is designed for calculating velocities of generated acoustic compression waves respectively acoustic shear waves that get to travel from the built-in generators 7 towards the built-in detectors 10 through local ground layers.

Figure 5:
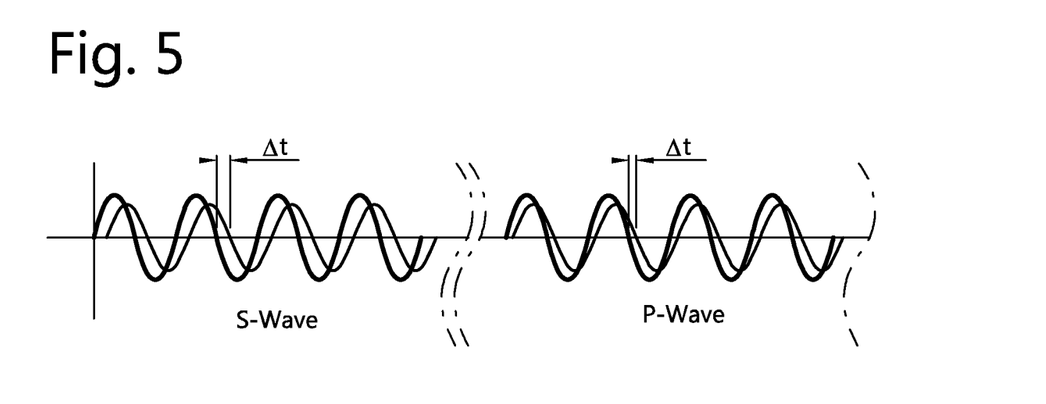
FIG. 5 shows phase shifts between the generated and detected acoustic shear and compression waves.

The soil probing device can be used as follows:

The vehicle 4 gets installed at an aimed testing location after which it starts to penetrate the probing rod 1 into the ground, for example at a speed of 2 cm/sec. During this penetration, the generator 7 is controlled by the CPU to alternatingly generate determined number of periods, for example 5, of the sinusoidal acoustic compression waves in the z-direction, followed by determined number of periods, for example also 5, of the sinusoidal acoustic shear waves in the x-y direction. The detector 10 then shall start to alternatingly detect those generated acoustic compression and shear waves, and sends those data to the CPU. As can be seen in FIG. 5 a phase shift shall occur between the generated and detected wave signals. Also the detected wave signals shall be slightly dampened compared to the generated ones.

The CPU is designed to perform the following calculations for the respective velocities of the alternatingly generated sinusoidal compression and shear waves that get to travel from the built-in generators towards the built-in detectors through local ground layers that lie adjacent the measuring probe in between the built-in generators and detectors:

A set (corresponding to the generated number of periods) of detected sinusoidal compression wave signals can be deducted from a corresponding set of generated sinusoidal compression wave signals. This results in an average phase shift for this set which can be divided by the fixed distance L that the compression wave signals have travelled through those local ground layers where the probe 2 at that moment is passing along. This then gives the local velocity for the compression waves through those local ground layers.

Subsequently a set (corresponding to the generated number of periods) of detected sinusoidal shear wave signals can be deducted from a corresponding set of generated sinusoidal shear wave signals. This results in an average phase shift for this set which can be divided by the fixed distance L that the shear wave signals have travelled through those local ground layers where the probe 2 at that moment is passing along. This then gives the local velocity for the shear waves through those local ground layers.

This alternatingly generating, detecting and calculation of the local velocities of the compression and shear waves is then repeated over and over again during the entire penetration movement of the probing rod 1 into the ground.

If necessary the calculations can be improved by taking account of known amplitude damping and velocity speed of compression and shear waves traveling directly along walls of the intermediate section 2b from the generator 7 towards the detector 10. Thus the velocity signals of the compression and shear waves can be obtained that have truly travelled through the local ground layers adjacent the measuring probe 2. In a similar manner all kinds of interference signals, for example originating from the drive means 3 or motor of the vehicle 4, can be filtered out in order to further improve the calculations.

Figure 6:
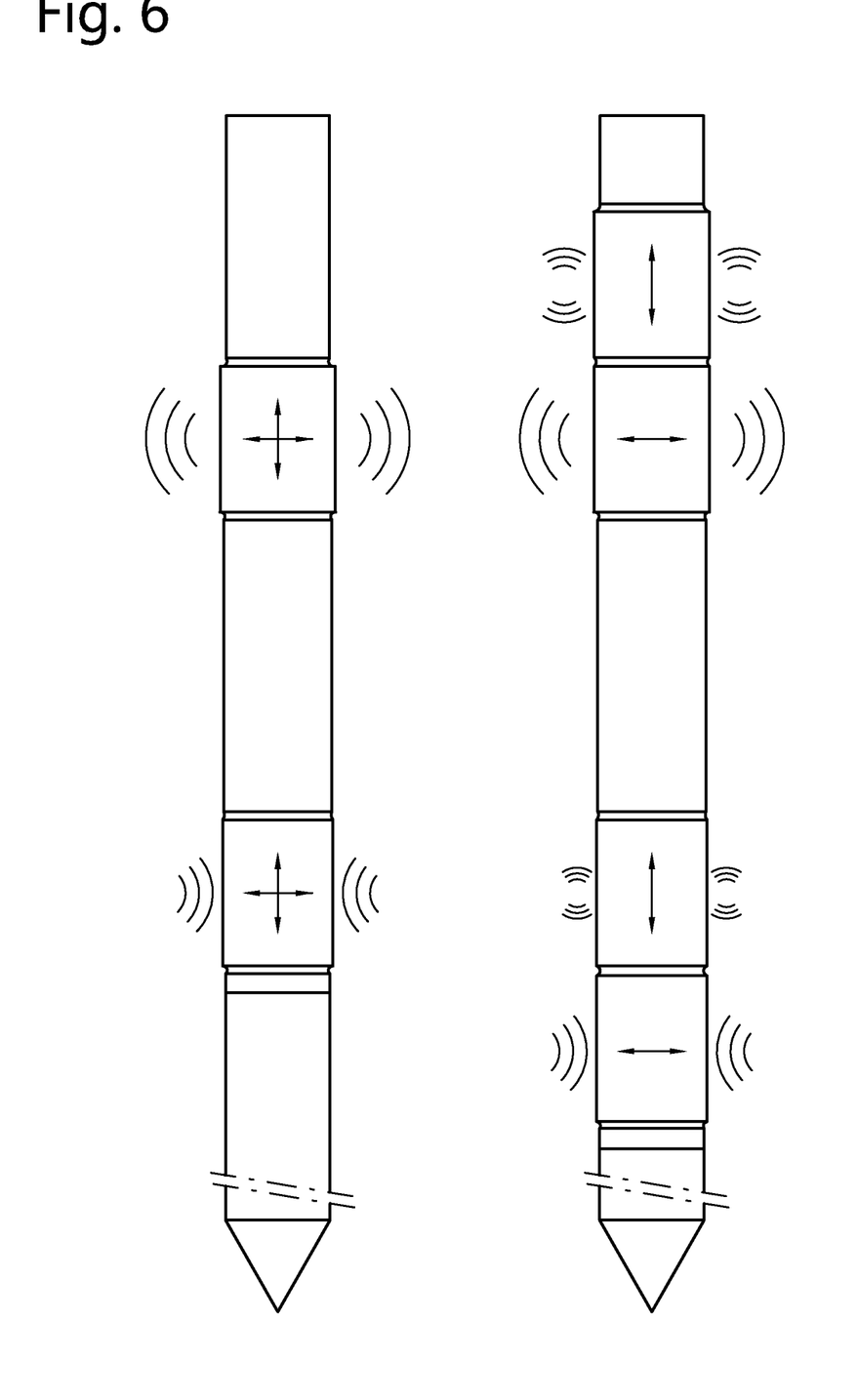
FIG. 6 shows on its left side the view of FIG. 3 with one generator and detector, and on its right side an alternative with two generators and detectors.

Instead of using one common generator for generating both the compression and shear waves, it is also possible to use a distinctive generator for the compression waves and a distinctive generator for the shear waves. Those respective generators then can be placed on top of each other, with or without a flexible connection there between. Likewise, it is also possible to use a distinctive detector for the compression waves and a distinctive detector for the shear waves which can be placed on top of each other, with or without a flexible connection there between. This is shown in FIG. 6 on the right side.

Figure 7:
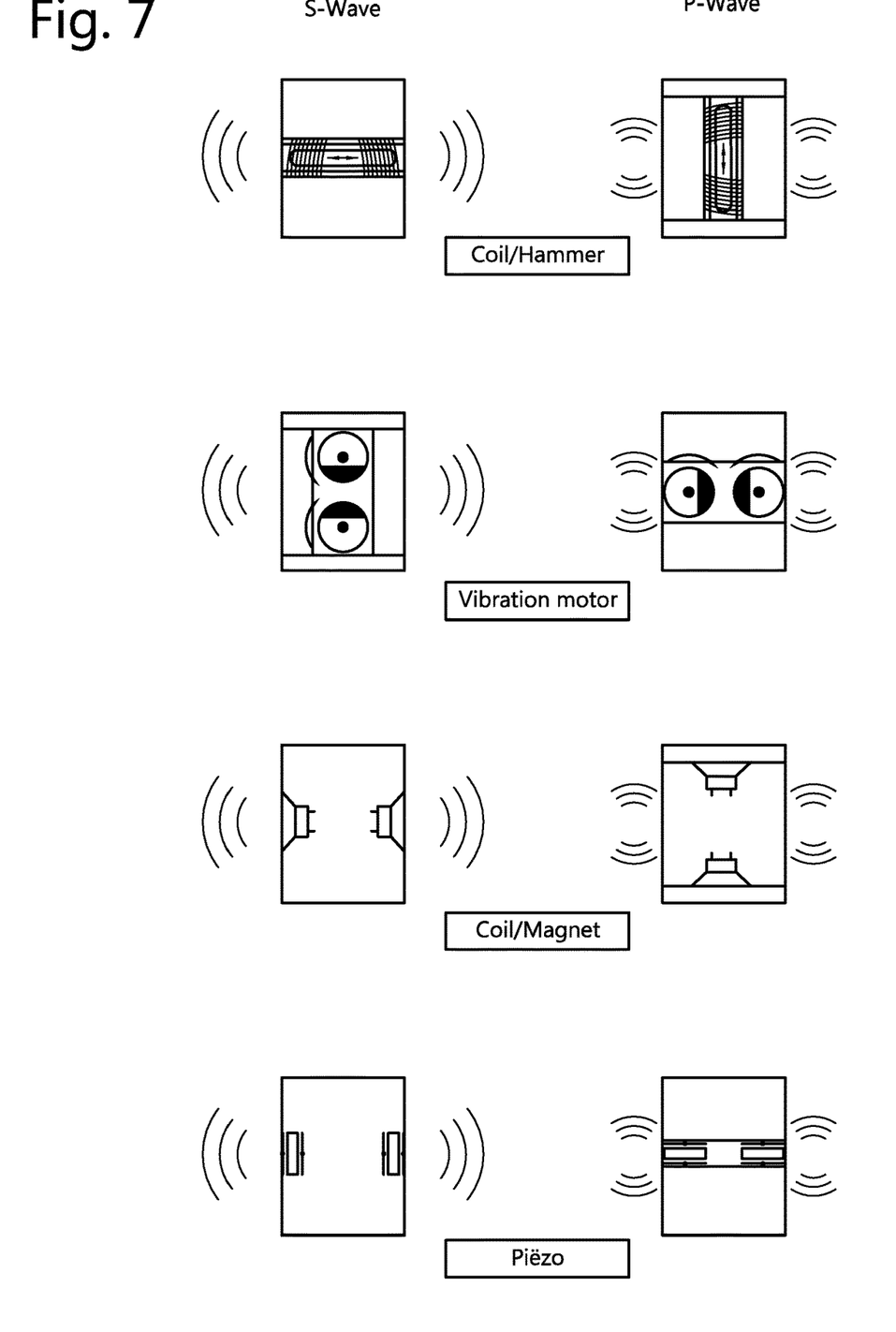
FIG. 7 shows possible embodiments for the generators.
Figure 8:
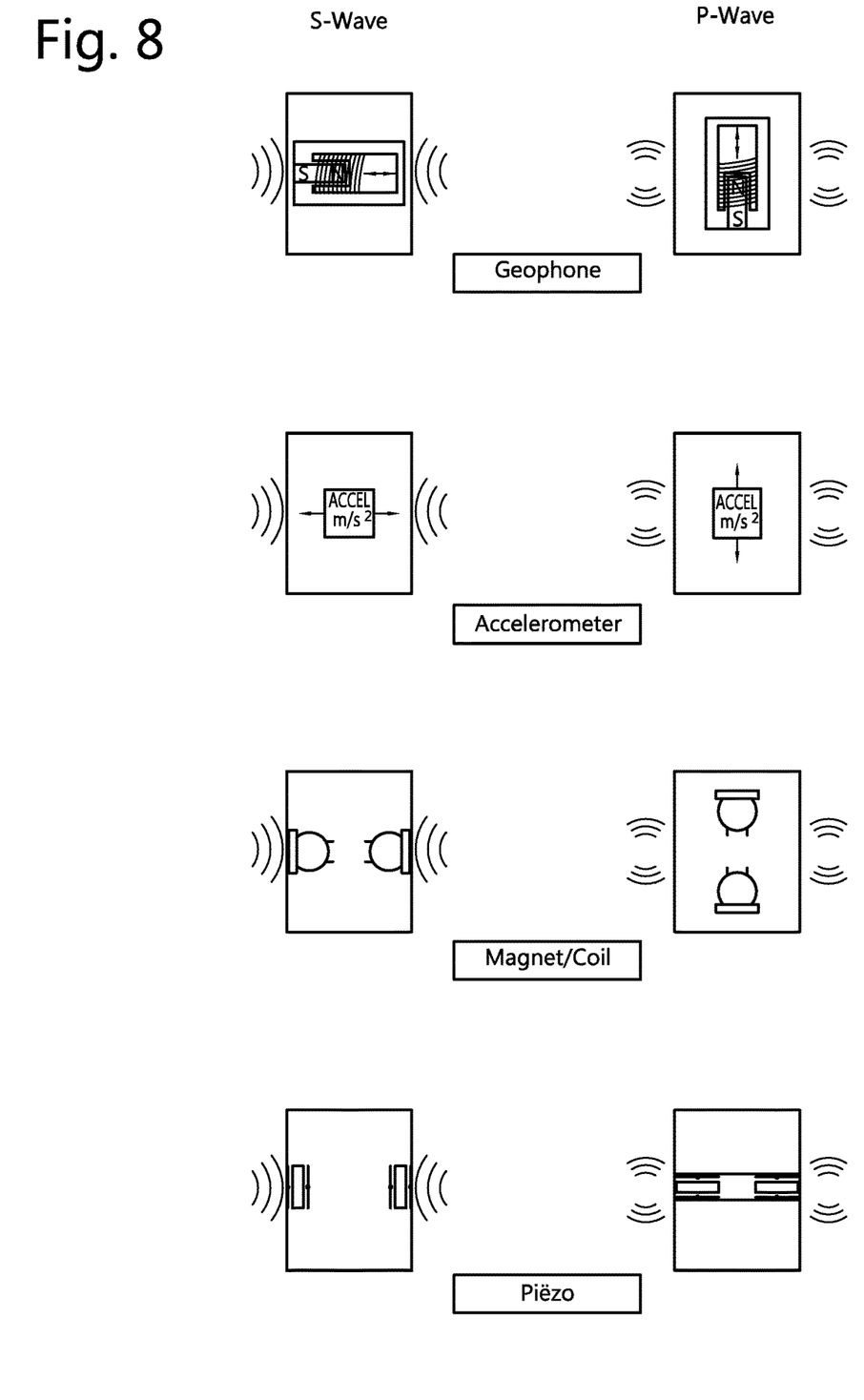
FIG. 8 shows possible embodiments for the detectors.

For the generator(s) 7 a large number of possible sources are available to be used. FIG. 7 for example shows coil/hammers, vibration motors, coil/magnets, and piezo elements. For the detectors 10 also a large number of possible sensors are available to be used. FIG. 8 shows geophones, accelerometers, magnet/coils and piezo elements. All combinations are possible.

Besides the embodiments shown all kinds of variants are possible. For example the dimensioning and shapes of the various parts can be varied. The generators and detectors can also be built-in in other relative positions in the measuring probe. Instead of having the generators and detectors lie around the entire circumference of the probe, it is also possible to have them provided at only one or only a limited number of circumferential positions. The generators, detectors and the CPU can be connected to each other and with a control unit above ground by means of a digital APB-databus, or the like. Owing to the limited amounts of data that need to get transferred owing to the invention it is however also possible to have the data sent wireless between one or more of them. Instead of having the CPU embedded inside the measuring probe, it can also be positioned above ground. It is also possible to have the CPU make use of a so-called phase locked loop (PLL) circuit that locks on the detected signal and that gives as output the phase shift with the generated signal.

Thus according to the invention a fast, accurate and reliable device and method are provided for determining velocities of compression and shear waves in a continuous manner simultaneously with measuring of cone tip resistance, sleeve friction, etc. during penetration of a probing rod into the ground.

The invention claimed is:

1. A soil probing device, comprising:
   a probing rod with a measuring probe at its lower end having a central axis extending in a z-direction;
   driving means for penetrating the probing rod in the z-direction into the ground;
   one or more generators for generating acoustic compression waves (P-waves) with a vibration direction in said z-direction into the ground and for generating acoustic shear waves (S-waves) with a vibration direction in an x-y direction perpendicular to said z-direction into the ground;
   one or more detectors for detecting said generated acoustic compression waves (P-waves) and for detecting said generated acoustic shear waves (S-waves); and
   a processing unit for determining properties of soil during penetration of the probing rod into the ground,
   wherein the detectors are built into the measuring probe,
   wherein the generators are built into the measuring probe at positions that are interspaced at fixed distances in said z-direction from the detectors in the measuring probe,
   wherein the processing unit is designed for calculating respective velocities of said generated acoustic compression waves (P-waves) and acoustic shear waves (S-waves) to travel from the built-in generators towards the built-in detectors through local ground layers that lie adjacent and against the measuring probe in between the built-in generators and detectors,
   wherein the processing unit is further designed for calculating of the respective velocities of the generated acoustic compression waves (P-waves) and acoustic shear waves (S-waves) through the local ground layers based upon phase shifts between the corresponding respective generated and detected acoustic compression waves (P-waves) and acoustic shear waves (S-waves) divided by the corresponding fixed distances between the built-in generators and detectors, and
   wherein the measuring probe at its free lower end, in front of the built-in generators and detectors, comprises a nose section, which nose section has a maximum outer cross-sectional dimension that is equal to or smaller than outer cross sectional dimensions of the detectors and generators that lie above this nose section, such that the detectors and generators come to lie directly against local ground layers during penetration of the probing rod with the measuring probe into the ground, and such that the detectors and generators get to slide along those local ground layers during the penetration of the probing rod with the measuring probe into the ground.

2. The soil probing device according to claim 1, wherein the generators comprise sinusoidal vibration sources for generating sinusoidal acoustic compression waves (P-waves) and sinusoidal acoustic shear waves (S-waves) respectively.

3. The soil probing device according to claim 2, wherein the generators are designed for generating said sinusoidal acoustic compression waves (P-waves) and said sinusoidal acoustic shear waves (S-waves) at frequencies of at least 50 Hz.

4. The soil probing device according to claim 1, wherein the detectors lie at a side of a front end section of the measuring probe, and wherein the generators lie at a side of a rear end section of the measuring probe with an intermediate section of the measuring probe lying in between the detectors and generators.

5. The soil probing device according to claim 1, wherein the detectors or generators that lie at a side of a rear end section of the measuring probe have an outer cross sectional dimension that is larger than the outer cross sectional dimension of the detectors or generators that lie at a side of a front end section of the measuring probe.

6. The soil probing device according to claim 5, wherein the detectors or generators that lie at a side of a rear end section of the measuring probe have an outer cross sectional dimension that is between 1-5 mm larger than the outer cross sectional dimension of the detectors or generators that lie at a side of a front end section of the measuring probe.

7. The soil probing device according to claim 1, wherein the generators have an outer cross-sectional dimension that is larger than an outer cross sectional dimension of an intermediate section of the measuring probe lying in between the generators and detectors.

8. The soil probing device according to claim 7, wherein the generators have an outer cross-sectional dimension that is 1-5 mm larger than an outer cross sectional dimension of an intermediate section of the measuring probe lying in between the generators and detectors.

9. The soil probing device according to claim 1, wherein the fixed distance in said z-direction between the generators and detectors lies in between 10-50 cm.

10. The soil probing device according to claim 1, wherein the generators and/or detectors are flexibly connected to the measuring probe.

11. The soil probing device according to claim 1, wherein the measuring probe further comprises a conical nose section for measuring cone tip resistance, and/or a friction sleeve for measuring sleeve friction during penetration of the probing rod into the ground.

12. The soil probing device according to claim 1, wherein the probing rod, while being penetrated into the ground, is extendable each time by a new one of rod sections.

13. A method for determining properties of soil during penetration of a probing rod into the ground using the soil probing device according to claim 1, comprising the steps of:
penetrating the probing rod into the ground;
determining properties of the soil during penetration of the probing rod into the ground, including calculating respective velocities of generated acoustic compression waves (P-waves) and acoustic shear waves (S-waves) that travel from the generators towards the detectors through ground layers that lie in between them;
wherein the detectors and generators lie directly against local ground layers during penetration of the probing rod with the measuring probe into the ground,
wherein the detectors and generators slide along those local ground layers during the penetration of the probing rod with the measuring probe into the ground,
wherein the respective acoustic compression waves (P-waves) and acoustic shear waves (S-waves) are generated directly into those local ground layers that lie adjacent and against the measuring probe in between the built-in generators and detectors,
wherein the calculating of the respective velocities of the generated acoustic compression waves (P-waves) and acoustic shear waves (S-waves) through the local ground layers is based upon phase shifts between the corresponding respective generated and detected acoustic compression waves (P-waves) and acoustic shear waves (S-waves) divided by the corresponding fixed distances between the built-in generators and detectors.

14. The method according to claim 13, wherein during the generating of the acoustic compression waves (P-waves) and acoustic shear waves (S-waves) directly into the local ground layers by the built-in generators and during the penetrating movement of the probing rod into the ground, a simultaneous measuring of cone tip resistance, sleeve friction, inclination, water pressure and/or temperature takes place with the measuring probe.

15. The method according to claim 13, wherein the acoustic compression waves (P-waves) and acoustic shear waves (S-waves) are generated and detected during a continuous penetrating movement of the probing rod into the ground.

16. The method according to claim 13, wherein the penetrating of the probing rod into the ground, takes place while extending it each time by a new one of rod sections.

17. A soil probing device, comprising:
a probing rod with a measuring probe at its lower end having a central axis extending in a z-direction;
driving means for penetrating the probing rod in the z-direction into the ground;
one or more generators for generating acoustic compression waves (P-waves) with a vibration direction in said z-direction into the ground and for generating acoustic shear waves (S-waves) with a vibration direction in an x-y direction perpendicular to said z-direction into the ground;
one or more detectors for detecting said generated acoustic compression waves (P-waves) and for detecting said generated acoustic shear waves (S-waves); and
a processing unit for determining properties of soil during penetration of the probing rod into the ground,
wherein the detectors are built into the measuring probe,
wherein the generators are built into the measuring probe at positions that are interspaced at fixed distances in said z-direction from the detectors in the measuring probe,
wherein the processing unit is designed for calculating respective velocities of said generated acoustic compression waves (P-waves) and acoustic shear waves (S-waves) that travel from the built-in generators towards the built-in detectors through local ground layers that lie adjacent and against the measuring probe in between the built-in generators and detectors,
wherein the measuring probe at its free lower end, in front of the built-in generators and detectors, comprises a nose section, which nose section has a maximum outer cross-sectional dimension that is equal to or smaller than outer cross sectional dimensions of the detectors and generators that lie above this nose section, such that the detectors and generators come to lie directly against local ground layers during penetration of the probing rod with the measuring probe into the ground, and such that the detectors and generators get to slide along those local ground layers during the penetration of the probing rod with the measuring probe into the ground, and wherein the generators comprise sinusoidal vibration sources for alternatingly generating sinusoidal acoustic compression waves (P-waves) and sinusoidal acoustic shear waves (S-waves).

18. The soil probing device according to claim 17, wherein the generators are designed for generating said sinusoidal acoustic compression waves (P-waves) and said sinusoidal acoustic shear waves (S-waves) at frequencies of at least 50 Hz.

19. The soil probing device according to claim 17, wherein the detectors lie at a side of a front end section of the measuring probe, and wherein the generators lie at a side of a rear end section of the measuring probe with an intermediate section of the measuring probe lying in between the detectors and generators.

20. The soil probing device according to claim 17, wherein the detectors or generators that lie at a side of a rear end section of the measuring probe have an outer cross sectional dimension that is larger than the outer cross sectional dimension of the detectors or generators that lie at a side of a front end section of the measuring probe.

21. The soil probing device according to claim 20, wherein the detectors or generators that lie at a side of a rear end section of the measuring probe have an outer cross sectional dimension that is between 1-5 mm larger than the outer cross sectional dimension of the detectors or generators that lie at a side of a front end section of the measuring probe.

22. The soil probing device according to claim 17, wherein the generators have an outer cross-sectional dimension that is larger than an outer cross sectional dimension of an intermediate section of the measuring probe lying in between the generators and detectors.

23. The soil probing device according to claim 22, wherein the generators have an outer cross-sectional dimension that is 1-5 mm larger than an outer cross sectional dimension of an intermediate section of the measuring probe lying in between the generators and detectors.

24. The soil probing device according to claim 17, wherein the fixed distance in said z-direction between the generators and detectors lies in between 10-50 cm.

25. The soil probing device according to claim 17, wherein the generators and/or detectors are flexibly connected to the measuring probe.

26. The soil probing device according to claim 17, wherein the measuring probe further comprises a conical nose section for measuring cone tip resistance, and/or a friction sleeve for measuring sleeve friction during penetration of the probing rod into the ground.

27. The soil probing device according to claim 17, wherein the probing rod, while being penetrated into the ground, is extendable each time by a new one of rod sections.

28. A method for determining properties of soil during penetration of a probing rod into the ground using the soil probing device according to claim 17, comprising the steps of:

penetrating the probing rod into the ground;

determining properties of the soil during penetration of the probing rod into the ground, including calculating respective velocities of generated acoustic compression waves (P-waves) and acoustic shear waves (S-waves) that travel from the generators towards the detectors through ground layers that lie in between them;

wherein the detectors and generators lie directly against local ground layers during penetration of the probing rod with the measuring probe into the ground, wherein the detectors and generators slide along those local ground layers during the penetration of the probing rod with the measuring probe into the ground, and wherein the respective acoustic compression waves (P-waves) and acoustic shear waves (S-waves) are generated directly into those local ground layers that lie adjacent and against the measuring probe in between the built-in generators and detectors, and wherein sinusoidal acoustic compression waves (P-waves) and acoustic shear waves (S-waves) are alternatingly generated by the generators.

29. The method according to claim 28, wherein sinusoidal acoustic compression waves (P-waves) and acoustic shear waves (S-waves) are alternatingly generated by the generators at intervals of between 2-10 periods and/or at frequencies of at least 50 Hz.

30. The method according to claim 28, wherein during the generating of the acoustic compression waves (P-waves) and acoustic shear waves (S-waves) directly into the local ground layers by the built-in generators and during the penetrating movement of the probing rod into the ground, a simultaneous measuring of cone tip resistance, sleeve friction, inclination, water pressure and/or temperature takes place with the measuring probe.

31. The method according to claim 28, wherein the acoustic compression waves (P-waves) and acoustic shear waves (S-waves) are generated and detected during a continuous penetrating movement of the probing rod into the ground.

32. The method according to claim 28, wherein the penetrating of the probing rod into the ground, takes place while extending it each time by a new one of rod sections.

* * * * *